(12) United States Patent
Gordon et al.

(10) Patent No.: US 12,045,358 B2
(45) Date of Patent: Jul. 23, 2024

(54) SYSTEMS AND METHODS FOR ESTABLISHING SECURE COMMUNICATION VIA A SOFTWARE DEFINED NETWORK IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Jason A. Dearien, Moscow, ID (US)

(73) Assignee: Schweitzer Engineering Laboratories, Inc, Pullman, WA (US)

( * ) Notice: Subject to any disclaimer, the term of this patent is extended or adjusted under 35 U.S.C. 154(b) by 589 days.

(21) Appl. No.: 17/113,606

(22) Filed: Dec. 7, 2020

(65) Prior Publication Data

US 2022/0179980 A1 Jun. 9, 2022

(51) Int. Cl.
*G06F 21/60* (2013.01)
*G06N 5/02* (2023.01)
*G06N 20/00* (2019.01)

(52) U.S. Cl.
CPC ........... *G06F 21/606* (2013.01); *G06N 5/027* (2013.01); *G06N 20/00* (2019.01)

(58) Field of Classification Search
CPC ....... G06F 21/606; G06N 5/027; G06N 20/00
See application file for complete search history.

(56) References Cited

U.S. PATENT DOCUMENTS

| 7,729,276 | B2 | 6/2010 | Akyol | |
| 2011/0087878 | A1* | 4/2011 | Weis | ..................... H04L 63/162 |
| | | | | 713/160 |
| 2011/0296044 | A1* | 12/2011 | Weis | ................... H04L 43/0811 |
| | | | | 709/230 |
| 2018/0295535 | A1* | 10/2018 | Kavars | ...................... G06F 1/28 |
| 2019/0116183 | A1 | 4/2019 | Hussain | |
| 2019/0173860 | A1 | 6/2019 | Sankaran | |
| 2019/0342101 | A1 | 11/2019 | Hayes | |
| 2020/0106719 | A1 | 4/2020 | Acharya | |

OTHER PUBLICATIONS

"IEEE Standard for Local and Metropolitan Area Networks: Media Access Control (MAC) Security," in IEEE Std 802.1AE-2006, pp. 1-150, Aug. 18, 2006.*
"IEEE Standard for Local and metropolitan area networks-Media Access Control (MAC) Security," in IEEE Std 802.1AE-2018, pp. 1-239, Dec. 26, 2018.*
Naiara Moreira, Elías Molina, Jesús Lázaro, Eduardo Jacob, Armando Astarloa, Cyber-security in substation automation systems, Renewable and Sustainable Energy Reviews,vol. 54,2016,pp. 1552-1562.*

* cited by examiner

*Primary Examiner* — Matthew T Henning
(74) *Attorney, Agent, or Firm* — Richard M. Edge; Fletcher Yoder, P.C.

(57) ABSTRACT

A system has an intelligent electronic device (IED) and a switch configured to perform operations that include obtaining a rule associating a media access control security (MACsec) port identifier (PI) of the IED with a data flow, receiving a frame comprising data and the MACsec PI, and transmitting the data of the frame based on the data flow associated with the rule.

17 Claims, 5 Drawing Sheets

SYSTEMS AND METHODS FOR ESTABLISHING SECURE COMMUNICATION VIA A SOFTWARE DEFINED NETWORK IN AN ELECTRIC POWER DISTRIBUTION SYSTEM

BACKGROUND

This disclosure relates to systems and methods for using software defined network instructions to establish a secure communication link between different components of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other components of the electric power distribution system to enable the components to securely communicate with one another. For example, it may be difficult to use a software defined network to establish secure communication links between components that use different communication types or protocols.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system has an intelligent electronic device (IED) and a switch configured to perform operations that include obtaining a rule associating a media access control security (MACsec) port identifier (PI) of the IED with a data flow, receiving a frame that includes data and the MACsec PI, and transmitting the data of the frame based on the data flow associated with the rule.

In an embodiment, a switch for an electric power distribution system includes processing circuitry and a memory that has a tangible, non-transitory computer-readable medium having instructions. The instructions, when executed by the processing circuitry, are configured to cause the processing circuitry to perform operations that include receiving a frame from an intelligent electronic device (IED) of the electric power distribution system, the frame having data and a media access control security (MACsec) port identifier (PI), identifying a rule associated with the MACsec PI, wherein the rule defines a data flow, and transmitting the data of the frame based on the data flow defined by the rule.

In an embodiment, a tangible, non-transitory computer-readable medium has instructions that, when executed by processing circuitry, are configured to cause the processing circuitry to perform operations that include storing a set of rules in which each rule of the set of rules is associated with a respective media access control security (MACsec) port identifier (PI), receiving an indication of a MACsec PI from a switch of an electric power distribution system, identifying a rule of the set of rules based on the MACsec PI and the rule associating the MACsec PI with a data flow, and transmitting the rule to the switch in response to identification of the rule.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link between components of an electric power distribution system. Intelligent electronic devices (IEDs) may be used to control certain devices and to perform certain operations of the electric power distribution system. For example, an IED may be a relay that enables or blocks electrical power flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

In certain embodiments, the electric power distribution system may use a software-defined network (SDN) to facilitate communication between various components of the electric power distribution system. For example, the electric power distribution system may have a switch communicatively coupled to various IEDs. The switch may receive data from a first IED and may transmit the data to a second IED in order to enable the IEDs to transmit data between one another. The electric power distribution system may also include a controller communicatively coupled to the switch. The controller may provide rules or instructions to the switch regarding how data is to be transmitted within the electric power distribution system, such as by providing a location or a destination to which the switch is to transmit certain data (e.g., received from one of the IEDs). In this way, the controller may set up operation of the switch to transmit data. In certain embodiments, after setting up the operation of the switch, the controller may be communicatively decoupled from the switch, and the switch may continue to operate to communicate data without having to receive further instructions from the controller.

In some embodiments, the switch may establish a respective media access control security (MACsec) communication link and/or a respective MACsec key agreement (MKA) connectivity association with the IEDs and/or with other components to communicate data. To establish the MACsec communication link, an MKA protocol is initially established between the switch and the IED via an adoption link. During the MKA protocol, the switch may select a connectivity association key (CAK) from a set of keys (e.g., a set of keys generated by the switch, a set of keys received from the controller) and may distribute the CAK or a copy of the CAK to the IED via the adoption link. The switch may establish an MKA connectivity association upon verification that the IED possesses the CAK. The switch may then select a security association key (SAK) from the set of the keys for distribution to the IED via the MKA connectivity association. The switch may retain a copy of the same SAK, and the switch and the IED may use their respective copies of the SAK to establish a MACsec communication link for communicating with one another. For example, each of the switch and the IED may encrypt data using their copy of the SAK and/or may decrypt encrypted data using their copy of the SAK in order to transmit data securely between one another.

During establishment of the MKA connectivity association and/or of the MACsec communication link, the IED indicate a MACsec port identifier (PI) (e.g., by transmitting a frame that includes a MACsec security tag (SecTag) with the MACsec PI) to indicate a communication type, such as a protocol, with which the IED uses to communicate data. One of the rules transmitted by the controller may associate the MACsec PI with a data flow, such as a recipient IED of data associated with the MACsec PI. For example, after the MACsec communication link has been established, the IED may transmit a frame that includes various information, such as the data and the MACsec PI, to the switch. The switch may receive the frame, identify the MACsec PI associated with the frame, and reference the rule based on the MACsec PI. The switch may then transmit the data of the frame according to the data flow defined by the rule. In this manner, the SDN may be established based on data flows associated with MACsec PIs. The use of MACsec PI to establish the SDN may improve the establishment of the SDN. Indeed, it may be difficult to associate data flows with other information included in the frame. For example, different frames may include certain different information (e.g., port numbers), even though the respective data of each of the frames is to be transmitted in accordance to the same data flow (e.g., to the same recipient IED). Thus, such information may not be easily relied upon for identifying a particular data flow associated with a frame. However, the MACsec PI may remain static and may uniquely identify an associated data flow. That is, different frames having data to be transmitted in accordance to the same data flow may include the same MACsec PI. Therefore, the switch may use MACsec PI to establish an SDN more easily.

Figure 1:
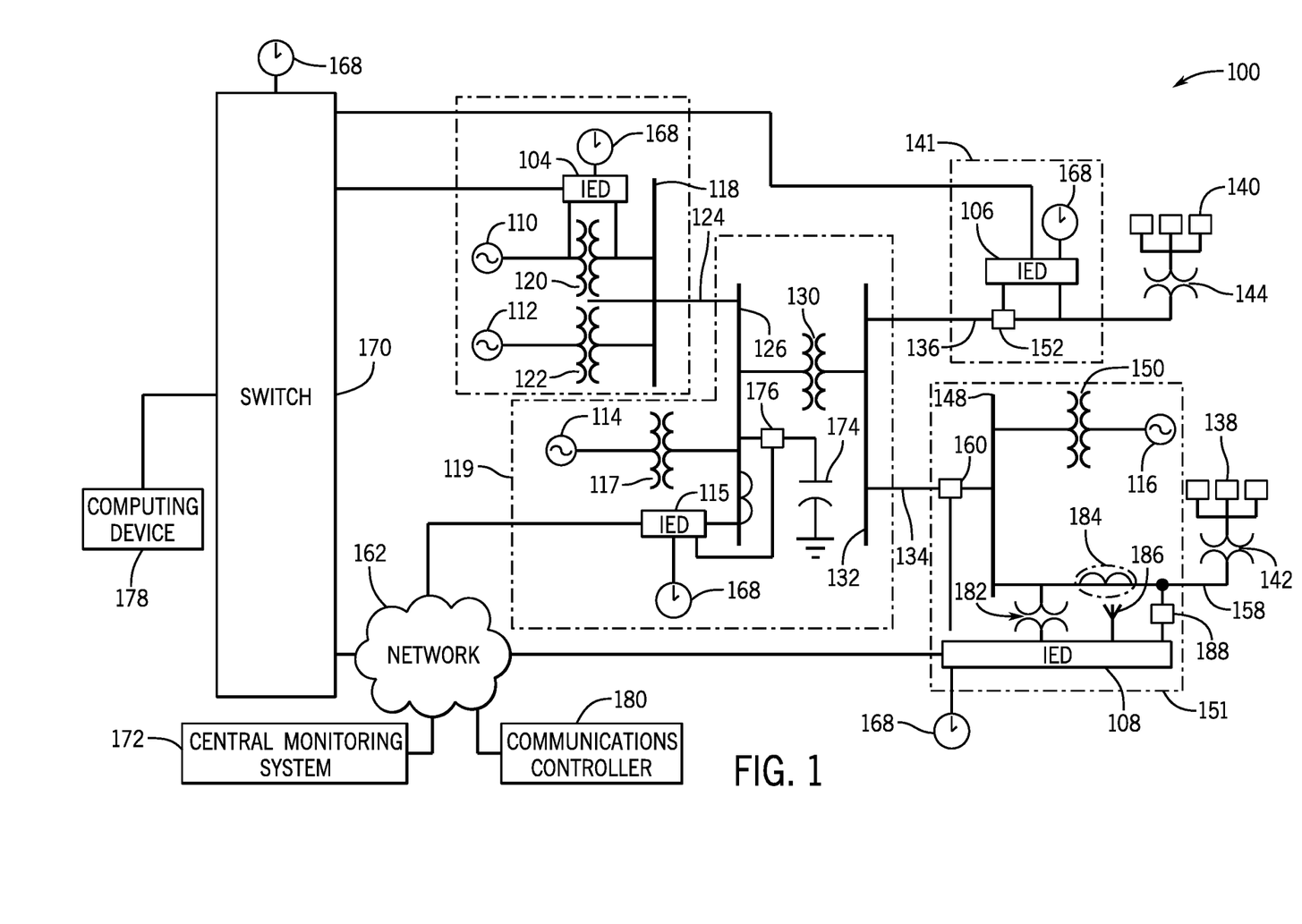
FIG. 1 is a schematic diagram of an embodiment of an electric power distribution system, in accordance with an embodiment of the present disclosure.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another component communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

As an example, the switch 170 may receive initial information (e.g., information indicative of a protocol for communicating data) from one of the IEDs 104, 106, 108, 115 and may communicate with the communications controller 180 to determine the location to which data associated with the initial information is to be transmitted. The communications controller 180 may instruct the switch 170 to transmit such data to another one of the IEDs 104, 106, 108, 115 and/or to an IED of another electric power distribution system 100 based on the initial information associated with the data. Afterward, the switch 170 may automatically transmit any data associated with the initial information based on the instructions received from the communications controller 180 without having to be further modified (e.g., manually configured). Indeed, the communications controller 180 may directly transmit rules or instructions (e.g., flows, matches, actions) to the switch 170, and the rules may define a suitable action (e.g., data transmission to one of the IEDs 104, 106, 108, 115) corresponding to received data (e.g., data received from any of the IEDs 104, 106, 108, 115) associated with certain information. In this manner, the switch 170 may determine a relevant rule received from the communications controller 180 (e.g., by matching information associated with the received data with information associated with the rules) to identify a suitable action to perform as defined by the relevant rule (e.g., by a data flow of the relevant rule).

Indeed, the rules received from the communications controller 180 may configure the switch 170 to transmit data automatically (e.g., without having to further communicate with the communications controller 180). Additional techniques for configuring an SDN are further described in U.S. patent application Ser. No. 17/008,901, filed on Sep. 1, 2020, which is incorporated by reference in its entirety for all purposes. In certain embodiments, after the communications controller 180 has configured the switch 170 to transmit data, the communications controller 180 may be communicatively decoupled (e.g., placed offline) from the IEDs 104, 106, 108, 115, and the switch 170 may continue to operate and control data transmission without communicating with the communications controller 180.

In some embodiments, the switch 170 and the IEDs 104, 106, 108, 115 may communicate with one another via a MKA connectivity association and/or a MACsec communication link. The MACsec communication link may be initiated via SAKs distributed to enable encryption and/or decryption of data. To this end, the switch 170 or another key device (e.g., a key server) may generate and distribute keys, such as CAKs and/or SAKs, to the IEDs 104, 106, 108, 115 to establish the MKA connectivity association and/or the MACsec communication link. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing an SAK to the IED via the MKA connectivity association, and communicating data with the IED using the SAK. Indeed, the switch 170 and the IED may use identical copies of the same SAK to encrypt data to be transferred as well as to decrypt encrypted data that has been received. Such encrypted data is transferred via a MACsec communication link established between the components to transfer the data securely. Although the present disclosure primarily discusses the use of MKA connectivity associations and MACsec communication links to communicate data, any other suitable communication techniques may be used to communicate data between components of the electric power distribution system 100.

As described above, it may be difficult for the switch 170 to establish an SDN based on certain information of a frame that includes data to be transmitted between the IEDs 104, 106, 108, 115. For this reason, the switch 170 may establish the SDN based on specific information that may be used to establish the MKA connectivity associations and/or the MACsec communication links. Such information may be more accurately associated with a data flow for transmitting data, such as for indicating the intended recipient of data. As further described herein, the switch 170 may receive such information and may transmit the information to the communications controller 180 to receive rules defining how data is to flow between the IEDs 104, 106, 108, 115 based on the information. After receiving the rules from the communications controller 180, the switch 170 may enable data to flow between the IEDs 104, 106, 108, 115 based on the rules without having to further communicate with the communications controller 180.

Figure 2:
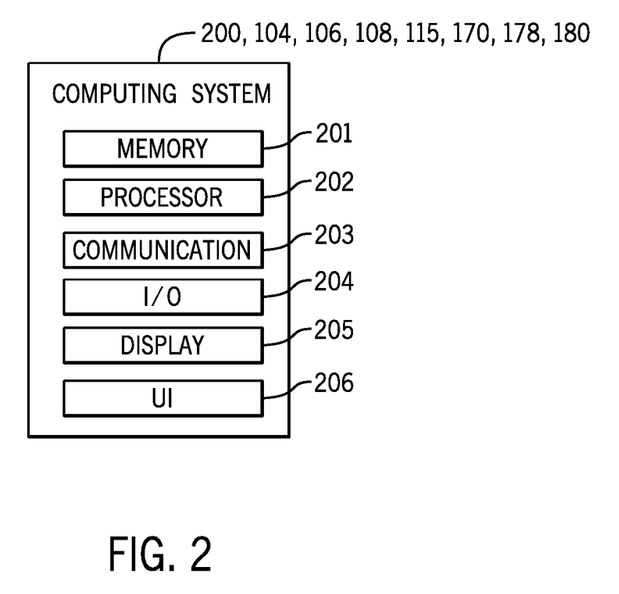
FIG. 2 is a schematic diagram of an embodiment of a computing system that may be incorporated in a component of an electric power distribution system, in accordance with an embodiment of the present disclosure of the present disclosure.

FIG. 2 is a schematic diagram of an embodiment of a computing system 200 that may be incorporated within a component of the electric power distribution system 100, such as in any of the IEDs 104, 106, 108, 115, the switch 170, the computing device 178, and/or the communications controller or key device or 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
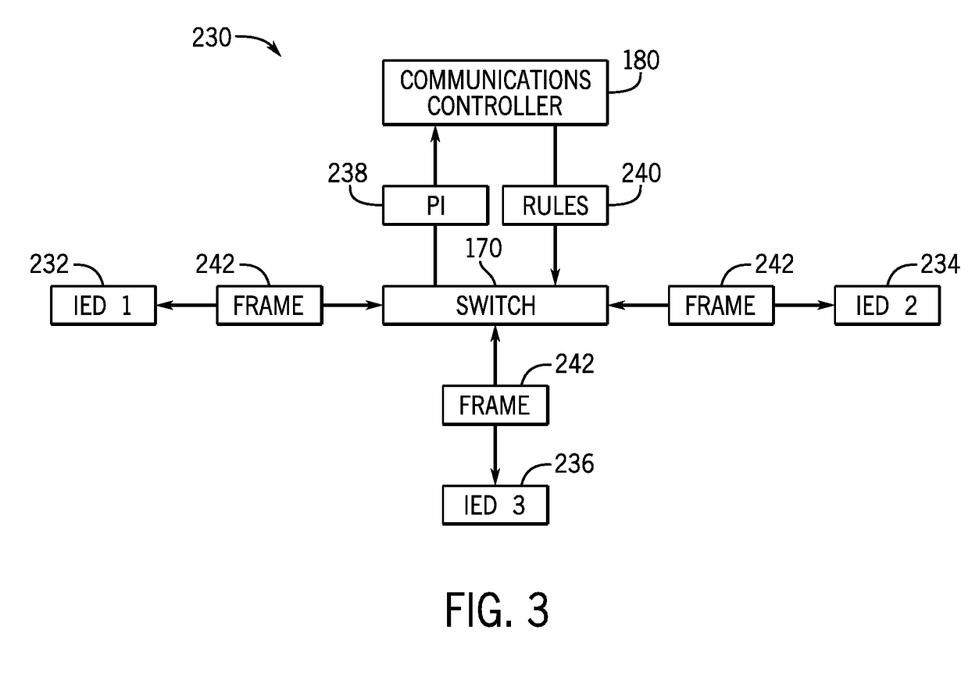
FIG. 3 is a schematic diagram of an embodiment of a communications network having a communications controller that may configure a switch to transmit data based on a media access control security (MACsec) port identifier (PI), in accordance with an embodiment of the present disclosure.

FIG. 3 is schematic diagram of an embodiment of a communication network 230 that includes the switch 170 communicatively coupled to the communications controller 180. The switch 170 is also communicatively coupled to a first IED 232, a second IED 234, and a third IED 236. In additional or alternative embodiments, the switch 170 may be communicatively coupled to any suitable number of components, such as IEDs, computing devices, and so forth. The switch 170 may establish a respective MKA connectivity association and/or a respective MACsec communication link between the switch 170 and each of the IEDs 232, 234, 236 (e.g., prior to there being an established secure communication link between any of the IEDs 232, 234, 236 and/or between the switch 170 and any of the IEDs 232, 234, 236, to update an existing secure communication link between any of the IEDs 232, 234, 236 and/or between the switch 170 and any of the IEDs 232, 234, 236).

During establishment of the MKA connectivity association and/or of the MACsec communication link, the switch 170 may receive information (e.g., unique information) associated with each of the IEDs 232, 234, 236. Such information may include a MACsec PI, which is programmed via firmware and is based on a specification of a protocol used to communicate data. That is, each of the IEDs 232, 234, 236 may use a specific MACsec PI (e.g., a number between 1 and 65,535) based on the protocol used for communicating data, such as by referencing a lookup table that associates each protocol with a particular MACsec PI. The MACsec PI may be indicative of a port of a host IED out of which data is flowing. For example, upon establishment of the MACsec communication link, the switch 170 may receive a frame that includes the data along with the MACsec PI, and the switch 170 may determine from which port and from which IED the data was received based on the MACsec PI. Further, the MACsec PI may not change so long as the same protocol is being used. Thus, the MACsec PI may directly represent the corresponding protocol used by the IEDs 232, 234, 236 for communicating data and may be constantly relied upon to determine such a protocol.

Indeed, the MACsec PI may be reliably used to facilitate data flow via the switch 170. In some embodiments upon receipt of a MACsec PI 238, such as from the first IED 232, during establishment of the MKA connectivity association and/or the MACsec communication link, the switch 170 may transmit the MACsec PI 238 to the communications controller 180. In response, the communications controller 180 may transmit a rule 240 to indicate the recipient (e.g., an IED recipient) to where the data is to be transmitted and the protocol used for communicating the data corresponding to the MACsec PI 238. In additional or alternative embodiments, the communications controller 180 may pre-load the switch 170 with the rule 240. That is, the switch 170 may receive the rule 240 from the communications controller 180 without having to request or transmit information (e.g., the MACsec PI 238) to the communications controller 180, such as prior to communicatively coupling to any of the IEDs 232, 234, 236. The rule 240 may, for instance, be programmed (e.g., manually programmed) and stored in the communications controller 180. By way of example, the switch 170 may receive a MACsec PI of 901 from the first IED 232. The switch 170 may transmit the MACsec PI of 901 to the communications controller 180, and the communications controller 180 may transmit a rule 240 that is relevant to the MACsec PI of 901. As an example, the rule 240 may indicate that the MACsec PI of 901 uses a Generic Object Oriented Substation Events (GOOSE) protocol to transmit data and that such data is to be transmitted to the second IED 234. The switch 170 may then establish a respective MACsec communication link with the first IED 232 and with the second IED 234 based on the rule 240 to enable data flow accordingly.

Indeed, upon establishment of the MACsec communication links based on the rule 240 received from the communications controller 180, the switch 170 may be able to accurately transmit subsequently received data to an intended recipient. For example, the first IED 232 may transmit a frame 242 with the data to the switch 170. The frame 242 may include the MACsec PI 238 (e.g., the MACsec PI of 901) related to the rule 240 received from the communications controller 180. The switch 170 may therefore determine, based on the rule 240, that the data is to be transmitted to the second IED 234. As a result, the switch 170 may automatically transmit such data received from the first IED 232 to the second IED 234, rather than to the third IED 236 or to any other component.

During establishment of the MKA connectivity associations and/or of the MACsec communication links, the switch 170 may also receive another MACsec PI 238 (e.g., a MACsec PI of 10) from the first IED 232, transmit the other MACsec PI 238 to the communications controller 180, and receive an additional rule 240 indicating that the other MACsec PI 238 uses a different protocol (e.g., Address Resolution Protocol [ARP]) to transmit data and that such data is to be transmitted to the third IED 236. The switch 170 may subsequently receive another frame 242 from the first IED 232 including data and the other MACsec PI 238, and the switch 170 may transmit such data to the third IED 236 instead of to the second IED 234 or to any other component based on the additional rule 240. In this manner, the switch 170 may use the rules received from the communications controller 180 to determine whether data received from the first IED 232 is to be transmitted to the second IED 234 (e.g., via GOOSE based on the MACsec PI being 901) or to the third IED 236 (e.g., via ARP based on the MACsec PI being 10). The switch 170 may also receive MACsec PIs 238 from any of the other IEDs 234, 236 during establishment of the MKA connectivity associations and/or of the MACsec communication links, and the switch 170 may communicate with the communications controller 180 to receive rules defining the data flow associated with the MACsec PIs 238 to transmit data between the IEDs 232, 234, 236 accordingly.

Upon establishment of the MKA connectivity associations and/or the MACsec communication links, the switch 170 may have the relevant rules 240 readily available for reference to determine how data is to be transmitted between the IEDs 232, 234, 236. Indeed, the switch 170 may immediately be able to transmit data received from the IEDs 232, 234, 236 via the MACsec communication links without further communicating with the communications controller 180. The switch 170 may therefore improve latency of communicating data between the IEDs 232, 234, 236 after the communications controller 180 and the switch 170 have established the MKA connectivity associations and/or the MACsec communication links to improve setting up the SDN for the communication network 230.

Figure 4:
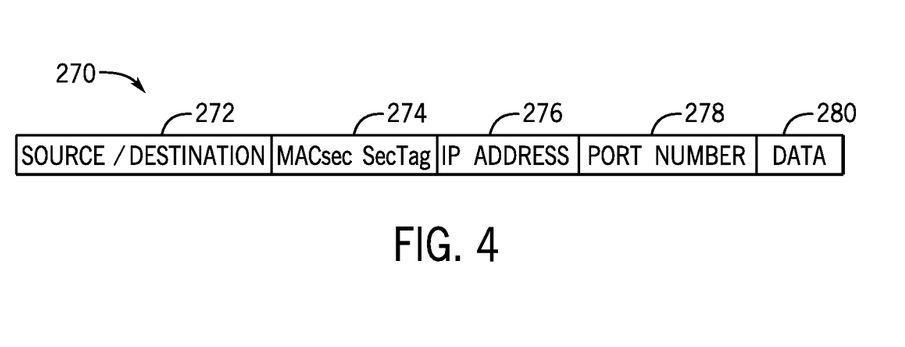
FIG. 4 is an embodiment of a header of a frame that may be transmitted from an intelligent electronic device to a switch for transmitting data within an electric power distribution system, in accordance with an embodiment of the present disclosure.

FIG. 4 is an embodiment of a header 270 of the frame 242 that may be transmitted by any of the IEDs 232, 234, 236 to the switch 170, such as after the MKA connectivity associations and/or the MACsec communication links have been established between the IEDs 232, 234, 236 and the switch 170. Indeed, the frame 242 may include data to be transmitted to one of the IEDs 232, 234, 236. The switch 170 may analyze the header 270 of the frame 242 in accordance with the rules or instructions received from the communications controller 180 to determine a corresponding action to perform with regard to the data of the frame 242 (e.g. to transmit the data to a corresponding one of the IEDs 232, 234, 236).

In the illustrated example, the header 270 includes a source/destination field 272, a MACsec SecTag 274, an Internet Protocol (IP) address field 276, a port number field 278 (e.g., a transmission control protocol [TCP] port number), and a data field 280. In additional or alternative embodiments, the header 270 may include a different set of fields, such as an additional MACsec integrity check value. The switch 170 may use the information listed in the different fields 272, 274, 276, 278, 280 of the header 270 of the frame 242 to determine the corresponding action to perform with the data transmitted with the frame 242. As described herein, the MACsec SecTag 274 may include or indicate a value of the MACsec PI, and the switch 170 may use the value of the MACsec PI to determine the corresponding action. For instance, the switch 170 may match the value of the MACsec PI with a MACsec PI associated with a particular rule received from the communications controller 180. The switch 170 may then perform a corresponding action defined by the particular rule. By way of example, the particular rule may instruct the switch 170 to transmit the data received along with the frame 242 (e.g., as indicated in the data field 280) to a specific one of the IEDs 232, 234, 236. As a result, the switch 170 may transmit the data to a corresponding one of the IEDs 232, 234, 236 based on the MACsec PI indicated by the MACsec SecTag 274 and a rule without having to analyze other information included in the frame 242.

As described herein, determining a corresponding action based on the value of the MACsec PI may improve an operation of the switch 170 to accurately transmit data. For example, in certain embodiments, after the SDN has been established, an IED may not further communicate with the switch 170 (e.g., to indicate that the IED is to receive data from another IED) Thus, the switch 170 may utilize the frame 242 received from a transmitting IED to determine the recipient IED to which data is to be transmitted without having to communicate with the recipient IED. In additional or alternative embodiments, it may be difficult to use another one of the fields 272, 276, 278, 280 to determine a corresponding action. For example, the value of the port number field 278 may also correspond to the protocol used by the IED to communicate data and/or the recipient of data of the frame 242. However, the value indicated by the port number field 278 may dynamically change for IEDs using a particular protocol (e.g., file transfer protocol). That is, the port number field 278 of a first frame transmitted by an IED may have a first value, and the port number field 278 of a second frame transmitted by the same IED may have a second value that is different than the first value, even though each of the first frame and the second frame is to be transmitted to the same recipient IED using the same protocol. As such, it may be difficult to associate the port number field 278 with a corresponding action to account for the dynamically changing port number field 278. However, the value of the MACsec PI may remain static (e.g., may not dynamically change) and may therefore be used more reliably to determine the protocol and the recipient of transmitted data.

Each of FIGS. 5-7 discussed below illustrates a method associated with communicating data for an SDN. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 5:
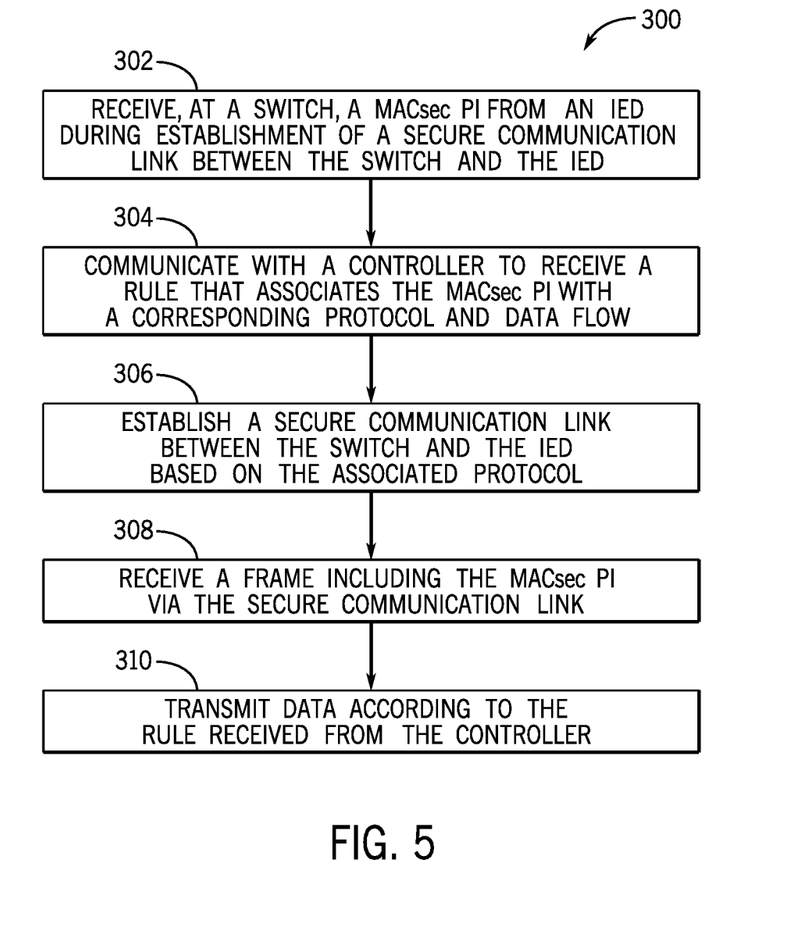
FIG. 5 is a flowchart of an embodiment of a method for communicating data based on a MACsec PI, in accordance with an embodiment of the present disclosure.

FIG. 5 is a flowchart of an embodiment of a method 300 for communicating data based on the frame 242 received from an IED. The method 300 is described herein from the perspective of the switch 170. At block 302, the switch 170 may receive a MACsec PI from an IED during establishment of a secure communication link (e.g., an MKA connectivity association, a MACsec communication link) between the switch 170 and the IED. The MACsec PI may indicate a manner in which the IED is to communicate data with another IED In some embodiments, the MACsec PI received from the IED indicates a communication type to be initiated by the IED, such as a protocol with which the IED is to transmit data. In additional or alternative embodiments, the MACsec PI received from the IED indicates a communication type to be received by the IED, such as a protocol with which the IED is to receive data. In any case, the MACsec PI received from the IED indicates a manner in which data is to be communicated between various IEDs.

At block 304, the switch 170 may communicate with the communications controller 180 to receive a rule that associates the MACsec PI received from the IED with a protocol and/or a data flow, such as by indicating to the communications controller 180 that the switch 170 has received the MACsec PI from the IED For example, the rule may indicate that, for a frame 242 containing the MACsec PI (e.g., a value or number of the MACsec PI field corresponding to the MACsec PI) along with data received from a first IED, the data of the frame 242 is to be transmitted to a second IED (e.g., and not to a third IED). The switch 170 may then store the rule for use at later time, such as for reference when receiving frames 242 and data from the IEDs In additional or alternative embodiments, the switch 170 may receive the rule without having to transmit information to the communications controller 180, such as by having the rule pre-loaded (e.g., prior to communicatively coupling with the IED) Thus, the switch 170 may already have a rule that is relevant to the IED prior to receiving the MACsec PI from the IED as described with respect to block 302. At block 306, establishment of the secure communication link between the switch 170 and the IED may be completed based on the protocol indicated by the rule. For instance, the secure communication links may enable the IED to transmit and/or receive data via the protocol indicated by the rule.

At block 308, the switch 170 may receive a frame 242 (e.g., from the IED that transmitted the MACsec PI received by the switch 170 at block 302, from a different IED in communication with the IED that transmitted the MACsec PI received by the switch 170 at block 302) via the secure communication link. The frame 242 may include the MACsec PI indicated by the rule received from the communications controller 180 with respect to block 304, as well as data to be transmitted to an additional IED In response, the switch 170 may transmit the data according to the rule received from the communications controller 180. That is, the switch 170 may determine that the MACsec PI included in the frame 242 corresponds to or matches to that associated with the rule received from the communications controller 180. As a result, at block 310, the switch 170 may perform the action (e.g., a data flow) defined by the rule, such as to transmit the data included in the frame 242 to the additional IED. For instance, the switch 170 may store multiple rules that are each associated with a different MACsec PI, and the switch 170 may identify and select a particular one of the rules associated with the MACsec PI included in the received frame 242. The switch 170 may then transmit the data based on the data flow defined by the selected rule.

It should be noted that the switch 170 may repeat any of the procedures of the method 300 during operation. For example, at block 302, the switch 170 may receive multiple different MACsec PIs from the IED during establishment of the secure communication link between the switch 170 and the IED, and each of the MACsec PIs may correspond to a respective protocol used by the IED to communicate data. The switch 170 may communicate with the communications controller 180 to receive multiple rules, each of which is associated with one of the multiple MACsec PIs received from the IED, as described at block 304. Additionally or alternatively, at block 302, the switch 170 may receive MACsec PIs from other IEDs during establishment of a respective secure communication link between the switch 170 and the other IEDs, and at block 304, the switch 170 may communicate with the communications controller 180 to receive a respective rule associated with the MACsec PIs received from the IEDs. Moreover, the switch 170 may repeat the procedures described at blocks 308 and 310. That is, the switch 170 may receive multiple frames 242 (e.g., from the same IED, from different IEDs), and the switch 170 may transmit the data of those frames 242 according to a respective rule received from the communications controller 180.

Figure 6:
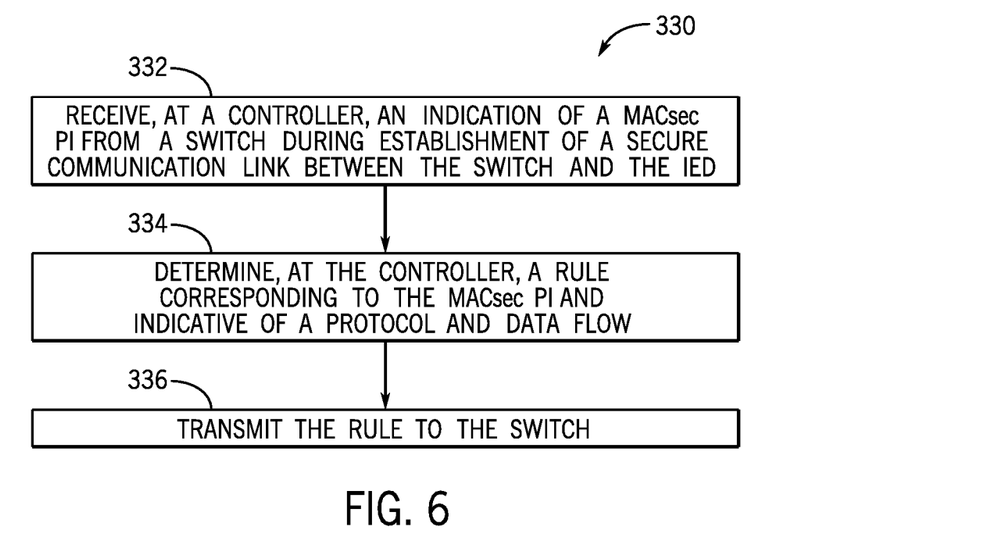
FIG. 6 is a flowchart of an embodiment of a method for transmitting a rule based on a MACsec PI, in accordance with an embodiment of the present disclosure.

FIG. 6 is a flowchart of an embodiment of a method 330 for transmitting a rule-based on a MACsec PI. The method 330 is described herein from the perspective of the communications controller 180. At block 332, the communications controller 180 may receive an indication of a MACsec PI from the switch 170 during establishment of a secure communication link between the switch 170 and an IED. For example, the communications controller 180 may receive the indication in response to the procedure performed by the switch 170 as described with respect to block 304 to communicate with the communications controller 180.

At block 334, the communications controller 180 may determine a rule corresponding to the MACsec PI. For instance, multiple rules may be programmed (e.g., manually programmed) and stored in the communications controller 180. The communications controller 180 may select the rule that is relevant to the MACsec PI from the rules programmed into the communications controller 180. In some embodiments, the rules may be programmed via a lookup table that associates various MACsec PIs with a corresponding rule. The communications controller 180 may reference the table to determine the rule corresponding to the MACsec PI indicated by the switch 170. At block 336, the communications controller 180 may transmit the determined rule to the switch 170. By way of example, the communications controller 180 and the switch 170 may be communicatively coupled via an MKA connectivity association and/or a MACsec communication link, and the communications controller 180 may transmit the rule to the switch 170 via the MKA connectivity association and/or the MACsec communication link.

The communications controller 180 may repeat any of the procedures of the method 330. Indeed, at block 332, the communications controller 180 may receive indications of multiple MACsec PIs from the switch 170 (e.g., based on the switch 170 receiving multiple MACsec PIs from an IED or from multiple LEDs), and at block 334, the communications controller 180 may determine respective rules corresponding to each of the MACsec PIs. At block 336, the communications controller 180 may then transmit each of the rules to the switch 170.

Figure 7:
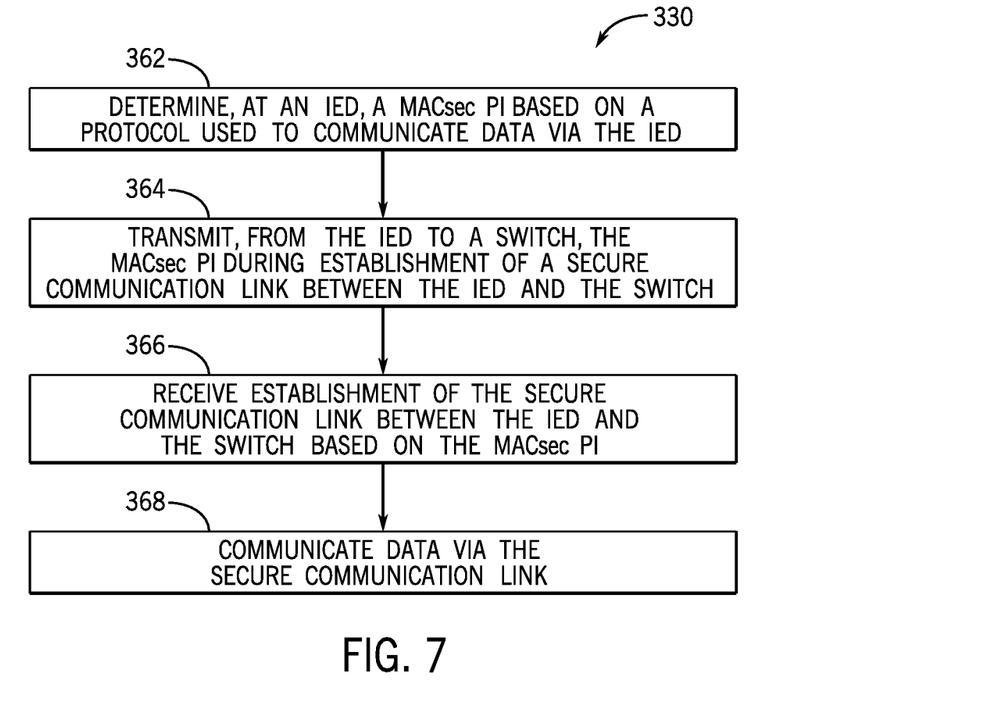
FIG. 7 is a flowchart of an embodiment of a method for communicating data via a security communication link established based on a MACsec PI, in accordance with an embodiment of the present disclosure.

FIG. 7 is a flowchart of an embodiment of a method 360 for communicating data via a secure communication link, such as a MACsec communication link. The method 360 is described herein from the perspective of an IED (e.g., one of the IEDs 104, 106, 108, 115, 232, 234, 236). At block 362, the IED may determine a MACsec PI based on a protocol used by the IED to communicate data (e.g., to transmit data, to receive data). For instance, the IED may reference a lookup table that associates various protocols with respective MACsec PIs, and the IED may determine the MACsec PI specifically corresponding to the protocol used by the IED. In some embodiments, the IED may communicate data via multiple protocols, and the IED may therefore determine multiple MACsec PIs corresponding to the protocols. At block 364, the IED may transmit the MACsec PI(s) determined with respect to block 362 to the switch 170 during establishment of the secure communication link between the IED and the switch 170.

At block 366, the IED may receive establishment of the secure communication link between the IED and the switch 170. Indeed, the secure communication link may be established based on the MACsec PI(s) transmitted by the IED via the procedure described with respect to block 364. At block 368, the IED may communicate data via the secure communication link. Indeed, the IED may transmit data (e.g., data encrypted by an SAK) via the secure communication link by using a frame 242 that includes the MACsec PI transmitted via the procedure described with respect to block 364. Additionally or alternatively, the IED may receive data (e.g., data encrypted by an SAK) via the secure communication link as transmitted by the switch 170, such as based on a rule referenced by the switch 170 based on the MACsec PI.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
an intelligent electronic device (IED), wherein the IED is used to control one or more devices of an electric power distribution system; and
a switch configured to perform operations comprising:
obtaining a rule associating a media access control security (MACsec) port identifier (PI) of the IED with a data flow, wherein the rule defines the data flow
receiving a frame from the IED, wherein the frame comprises data and the MACsec PI; and
transmitting the data of the frame based on the data flow defined by the rule;
distributing a connectivity association key (CAK) to the IED;
establishing a MACsec key agreement (MKA) connectivity association upon verification of the IED possessing the CAK;
distributing a security association key (SAK) to the IED via the MKA connectivity association to establish a MACsec communication link with the IED;
receiving the frame from the IED via the MACsec communication link; and
decrypting the data of the frame via a copy of the SAK.

2. The system of claim 1, wherein the switch is configured to perform operations comprising:
receiving the MACsec PI from the IED;
communicating with a controller to indicate the MACsec PI received from the IED; and
obtaining the rule from the controller in response to communicating with the controller.

3. The system of claim 2, wherein the switch is configured to obtain the rule from the controller prior to communicatively coupling with the IED.

4. The system of claim 1, wherein the IED is configured to communicate the data in accordance with a protocol, and the IED is configured to perform operations comprising:
determining the MACsec PI based on the MACsec PI being associated with the protocol; and
transmitting the MACsec PI to the switch in response to determining the MACsec PI.

5. The system of claim 4, wherein the IED is configured to determine the MACsec PI based on a lookup table associating various protocols with a respective MACsec PI.

6. The system of claim 1, wherein the switch is configured to receive the frame from the IED, from an additional IED of the system, or both.

7. The system of claim 1, wherein the switch is configured to transmit the data to the IED, to an additional IED of the system, or both, based on the data flow associated with the rule.

8. The system of claim 1, wherein the frame comprises information associated with a source, a destination, an Internet Protocol address, a port number, or any combination thereof.

9. The system of claim 1, wherein the switch is configured to perform operations comprising:
receiving an additional frame comprising additional data and the MACsec PI; and
transmitting the additional data of the additional frame based on the data flow associated with the rule;
wherein the frame and the additional frame are associated with the same protocol with which the data and the additional data, respectively, are to be communicated.

10. A switch for an electric power distribution system, the switch comprising:
processing circuitry; and
a memory comprising a tangible, non-transitory computer-readable medium comprising instructions, wherein the instructions, when executed by the processing circuitry, are configured to cause the processing circuitry to perform operations comprising:
receiving a frame from an intelligent electronic device (IED) of the electric power distribution system, wherein the IED is used to control one or more devices of the electric power distribution system, and wherein the frame comprises data and a media access control security (MACsec) port identifier (PI);
identifying a rule associated with the MACsec PI, wherein the rule defines a data flow;
transmitting the data of the frame based on the data flow defined by the rule;
distributing a connectivity association key (CAK) to the IED;
establishing a MACsec key agreement (MKA) connectivity association upon verification of the IED possessing the CAK;
distributing a security association key (SAK) to the IED via the MKA connectivity association to establish a MACsec communication link with the IED;
receiving the frame from the IED via the MACsec communication link; and
decrypting the data of the frame via a copy of the SAK.

11. The switch of claim 10, wherein the instructions, when executed by the processing circuitry, are configured to cause the processing circuitry to perform operations comprising:
receiving the MACsec PI from the IED during establishment of the MKA connectivity association and prior to receipt of the frame from the IED; and
communicating with a controller of the electric power distribution system to obtain the rule associated with the MACsec PI in response to receipt of the MACsec PI.

12. The switch of claim 11, wherein the instructions, when executed by the processing circuitry, are configured to cause the processing circuitry to perform operations comprising:
encrypting the data of the frame via an additional SAK; and
transmitting the data based on the data flow defined by the rule after encrypting the data.

13. The switch of claim 10, wherein the instructions, when executed by the processing circuitry, are configured to cause the processing circuitry to transmit the data to an additional IED of the electric power distribution system based on the data flow.

14. The switch of claim 13, wherein the instructions, when executed by the processing circuitry, are configured to cause the processing circuitry to perform operations comprising:
receiving an additional frame from the IED, wherein the frame comprises additional data and an additional MACsec PI;
identifying an additional rule associated with the additional MACsec PI, wherein the additional rule defines an additional data flow; and
transmitting the additional data of the additional frame to another IED that is different from the additional IED based on the additional data flow defined by the additional rule.

15. The switch of claim 14, wherein the MACsec PI and the additional MACsec PI are indicative of different protocols with which the IED uses to communicate the data and the additional data.

16. The switch of claim 10, wherein the instructions, when executed by the processing circuitry, are configured to cause the processing circuitry to perform operations comprising identifying the rule associated with the MACsec PI based on a lookup table that associates various protocols with a respective MACsec PI.

17. The switch of claim 10, wherein the frame comprises information associated with a source, a destination, an Internet Protocol address, a port number, or any combination thereof.

* * * * *